June 4, 1963  W. H. POWERS  3,092,204

SILENCER

Filed Nov. 28, 1960

INVENTOR.
Walter H. Powers
BY
Harness, Dickey & Pierce
ATTORNEYS.

3,092,204
SILENCER
Walter H. Powers, Racine, Wis., assignor to Walker Manufacturing Company, a corporation of Delaware
Filed Nov. 28, 1960, Ser. No. 72,124
4 Claims. (Cl. 181—36)

My invention relates to motor vehicles and, in particular, to means for silencing the passenger or driver's compartment of a motor vehicle.

It is an object of my invention to provide a very simple and inexpensive means for silencing the noise often encountered in the passenger or driver's compartment of an automotive vehicle, particularly the noise occuring at relatively high speeds.

The invention accomplishes the foregoing and other objects by means of an arrangement whereby the trunk or luggage compartment of the vehicle is used as a silencing chamber. Suitable conduits are provided to connect the luggage compartment with the passenger compartment to enable sound waves to pass into the luggage compartment and be dissipated therein.

A preferred form of the invention is illustrated in the accompanying drawings in which.

Figure 1:
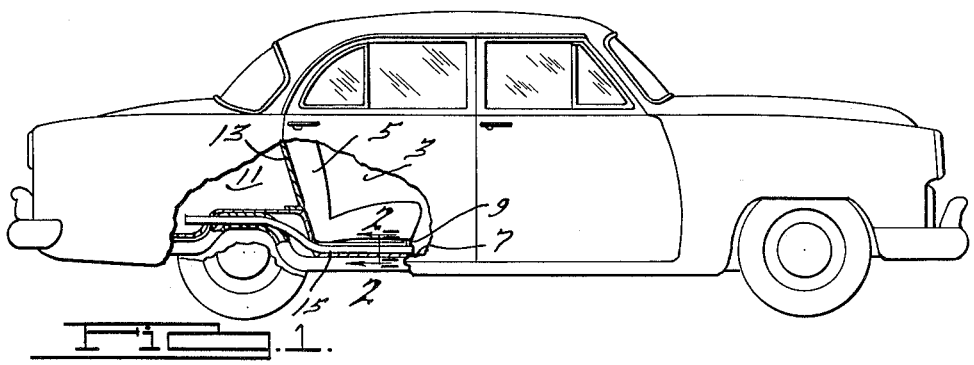
FIGURE 1 is a side view of a typical automobile partially broken away.
Figure 2:
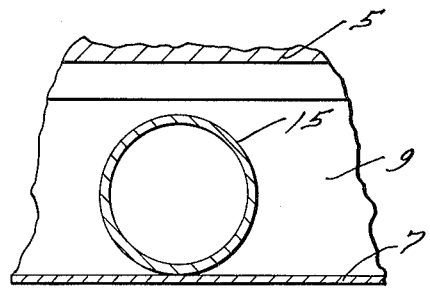
FIG. 2 represents an enlarged section along the line 2—2 of FIG. 1.

The vehicle 1 shown in the drawings has a passenger compartment 3 with a rear seat 5 that is supported above floor 7 by a platform structure 9. The compartment 3 is separated from the luggage compartment 11 by the partition 13. All the above structure is conventional and illustrative of an ordinary automobile.

As is well known the driver's compartment 3 of the automobile often becomes very noisy, particularly when the vehicle is travelling at high speeds. The present invention provides means to attenuate noise in the chamber 3 by utilizing the trunk chamber 11. For this purpose a conduit 15 is supported on the frame or chassis of the vehicle so that one end thereof opens in the passenger compartment 3 and the other end opens in the luggage compartment 11. Preferably, this conduit is imperforate and therefore will act as a tuning tube connecting the chamber 3 which is to be silenced with the chamber 11 which is a resonator or tuning chamber. More than one pipe 15 may be employed, and the size and length are selected insofar as possible to enable the chamber 11 to be tuned to the most bothersome frequencies found in the chamber 3.

It is within the broad scope of the invention to provide perforations (not shown) in the side walls of the tube 15 especially those portions which are located outside of the chamber 3 since such perforations may be useful in silencing high frequency noises. However, if optimum tuning of low frequencies is desired, the perforations in the tube 15 are preferably omitted.

Modifications may be made in the specific structure shown without departing from the spirit and scope of the invention.

I claim:
1. In a motor vehicle having a body with a passenger compartment and a large volume storage space separated from the compartment, a sound transmitting open ended tube opening into said passenger compartment at one end, said tube having an imperforate sidewall in the passenger compartment, said tube extending out of the passenger compartment and opening at its other end into said storage space located outside of the passenger compartment.

2. In a motor vehicle having a passenger compartment and a luggage compartment separated from the passenger compartment, an open ended tube opening into the passenger compartment at one end and into said other compartment at the other end, said tube having an imperforate sidewall in the passenger compartment, said tube and luggage compartment being tuned to attenuate sound in the passenger compartment.

3. The invention set forth in claim 2 wherein said tube has a sidewall that is imperforate throughout the length of the tube.

4. The invention set forth in claim 3 wherein said vehicle passenger compartment has a floor and a back seat and said tube opens adjacent the floor and under the back seat of the passenger compartment.

References Cited in the file of this patent

UNITED STATES PATENTS

| | | |
|---|---|---|
| 1,594,894 | Masury | Aug. 3, 1926 |
| 2,058,492 | Nystrom | Oct. 27, 1936 |
| 2,090,459 | Paton | Aug. 17, 1937 |
| 2,330,701 | Gerber | Sept. 28, 1943 |
| 2,340,152 | Steensen | Jan. 25, 1944 |
| 2,455,926 | Gessler et al. | Dec. 14, 1948 |
| 2,795,374 | Isakoff | June 11, 1957 |

FOREIGN PATENTS

| | | |
|---|---|---|
| 363,420 | Italy | Oct. 5, 1938 |
| 1,150,315 | France | Aug. 5, 1957 |

OTHER REFERENCES

V. L. Jordan: "The Application of Helmholtz Resonators to Sound-Absorbing Structures," The Journal of the Acoustical Society of America, Volume 19, No. 6, November 1947, pages 972–981.